United States Patent [19]

DeBenedictis

[11] Patent Number: 4,766,534
[45] Date of Patent: Aug. 23, 1988

[54] PARALLEL PROCESSING NETWORK AND METHOD

[75] Inventor: Erik P. DeBenedictis, Highlands, N.J.

[73] Assignee: American Telephone and Telegraph Company, AT&T Bell Laboratories, Murray Hill, N.J.

[21] Appl. No.: 919,808

[22] Filed: Oct. 16, 1986

[51] Int. Cl.⁴ .......................... G06F 9/00; G06F 9/06
[52] U.S. Cl. ..................................... 364/200; 364/300
[58] Field of Search ... 364/200 MS File, 900 MS File, 364/300 MS File

[56] References Cited

U.S. PATENT DOCUMENTS

| | | | |
|---|---|---|---|
| 4,247,892 | 1/1981 | Lawrence | 364/200 |
| 4,543,630 | 9/1985 | Neches | 364/200 |
| 4,590,468 | 5/1986 | Stieglitz | 364/200 |
| 4,620,276 | 10/1986 | Daniell et al. | 364/200 |
| 4,630,196 | 12/1986 | Bednar, Jr. et al. | 364/200 |
| 4,644,470 | 2/1987 | Feigenbaum et al. | 364/200 |
| 4,644,496 | 2/1987 | Andrews | 364/900 |
| 4,644,542 | 2/1987 | Aghili et al. | 364/200 |
| 4,649,473 | 3/1987 | Hammer et al. | 364/200 |

OTHER PUBLICATIONS

"The Multiprocessor Revolution: Harnessing Computers Together", *Technology Review*, Feb./Mar. 1986, pp. 46-57, M. L. Dertouzos.

*Primary Examiner*—Gareth D. Shaw
*Assistant Examiner*—Viet Q. Nguyen
*Attorney, Agent, or Firm*—Jerry W. Herndon

[57] ABSTRACT

A message passing parallel processing system capable of executing different types of intercommunication protocols simultaneously, as well as plural instances of each type of protocol. Each processing node of the system contains a message passing protocol apparatus comprising a protocol processor and a memory. Messages passed between nodes contains, inter alia, a protocol type and an identification of an instance of the protocol type. Examples of protocol types might be shared memory, hierarchical tree connect, distributed sets, etc. Messages are passed to processing nodes from other processing nodes in fixed sized blocks and only when input buffers are empty. Flow control of the network is self-regulating and the network is deadlock free.

8 Claims, 12 Drawing Sheets

DATA FLOW →

DATA MESSAGE FORMAT

PROTOCOL STATE VECTOR TABLE
(TREE CONNECT)

0 = CONNECT NOT SENT
1 = CONNECT SENT
2 = CONNECT ACKNOWLEDGED

VIRTUAL TREE DEFINED BY
PARENT (X) = INT$\left[\frac{x-1}{2}\right]$

DISTRIBUTED SET TREE USING NODES 8, 9, 6

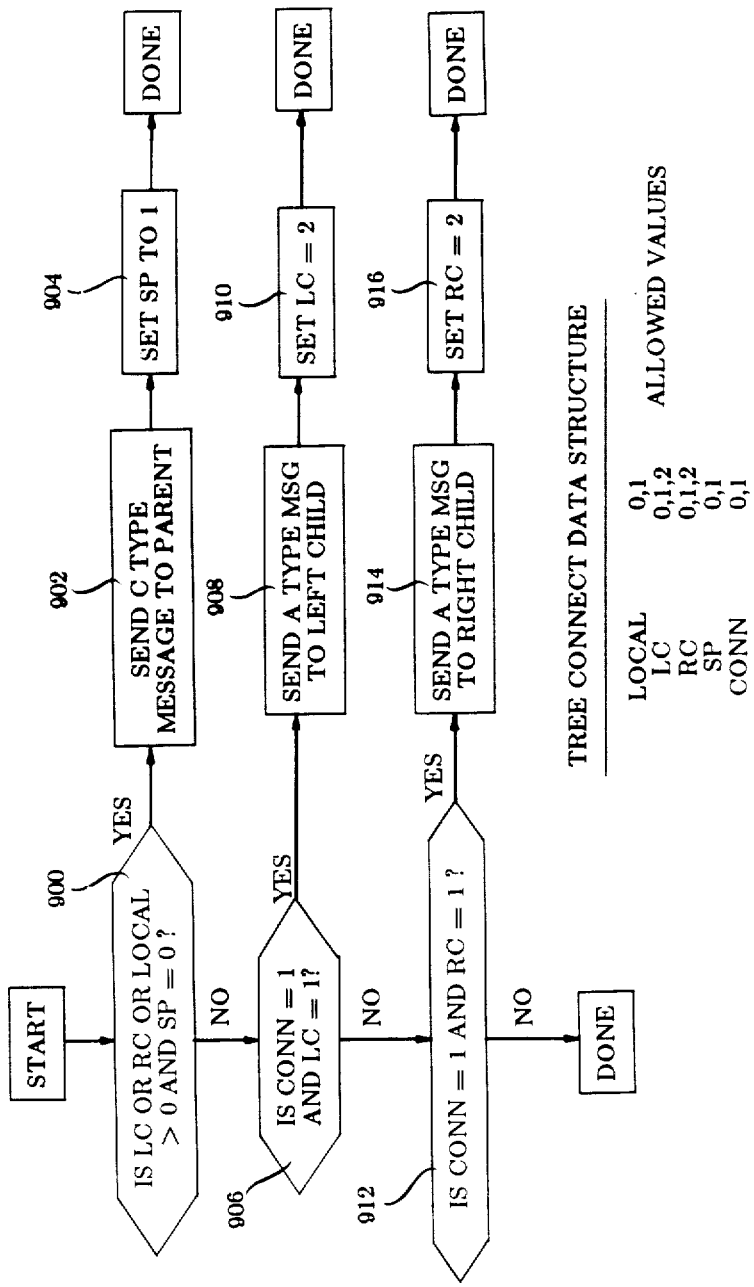

TREE CONNECT INPUT FUNCTION

PROTOCOL SCHEDULER

BROADCAST ALGORITHM

PARALLEL PROCESSING NETWORK AND METHOD

TECHNICAL FIELD

The invention is related to parallel processing networks in which a multiplicity of processors may operate more or less simultaneously on separate tasks of a computing problem, thereby speeding the problem solution. More particularly, the invention relates to such networks of the message passing type and to message passing protocol apparatus at each multiprocessing node which controls the parallel processing and allows the individual nodes to operate concurrently on a plurality of related or unrelated tasks.

BACKGROUND OF THE INVENTION

In the present state of the parallel processing art, the individual processing nodes of a parallel processing network are designed to execute efficiently a single network protocol or perhaps, say, two protocols, but at different times. A protocol might be one that implements a message passing algorithm between the processing nodes, or it might be a protocol for sharing a common memory between the individual nodes, or any of a number of other types of protocols. U.S. Pat. No. 4,247,892, issued to P. N. Lawrence, is illustrative of the state of the art of message passing parallel processing networks. Each processor of the network calculates the number of destination nodes a message from the processor must pass through en route to its destination node. Each processor then casts a vote for the most advantageous protocol, from its viewpoint, to use in the next message transmittal phase. A foreman computer tallies the votes and informs the other processors of the winning protocol. Only one type of protocol, however, may be performed in any transmitting phase of the network.

It has also been possible in such networks to simulate protocols other than the protocol for which the network was designed. When this has been done, however, the simulated operations have proven to be slow and inefficient. Moreover, in the single protocol and the simulated protocol networks, no way has been found simultaneously to perform plural protocols of a single type or plural protocols of a different type. However, if a network is to operate simultaneously on more than one problem at a time or at better efficiency, a need exists to execute at least plural instances of a protocol at the same time. And for even greater flexibility and efficiency, a need exists for a network to be able to execute simultaneously plural protocols of differing types, such as message passing, shared memory, distributed sets, and so on.

SUMMARY OF THE INVENTION

An advance in the art is achieved in a parallel processing system including a plurality of processing nodes interconnected in a prescribed manner and each having a message passing protocol engine for sending and receiving messages between the nodes. A message passed between processing nodes contains information identifying a protocol type to which the message belongs and an identification of a unique instance of the protocol type. A message also typically contains some form of data required for processing or for other purposes. Each protocol engine contains a protocol processor for performing input functions and output functions independently on messages received and to be transmitted, respectively, according to the protocol type identified in the message.

A memory accessible by the protocol processor stores state information in memory vectors individually pertaining to each protocol type and to each instance of a protocol type. The state vectors contain protocol status information for controlling the operations of the independent input and output functions pertaining to each instance of each protocol type.

In the preferred embodiment, a processing node further includes a compute processor also having access to the memory, and being responsive to the data in a received message and to the state vector information pertaining to the protocol instance with which the data is associated for performing a data processing task and for storing results of the task in the memory for access by the protocol processor.

A protocol engine further includes an input queue accessible by the protocol processor for receiving messages incoming from other ones of the processing nodes. An activity queue is accessible by the protocol processor for storing and retrieving identifications of active protocols that for one reason or another require future processing. A multiplexer interconnects the input message queue and an output of the activity queue to the protocol processor. Multiplexing means select input data to the protocol processor either from the input queue or from the output of the activity queue.

If an arriving message or an output from the activity queue has the effect of initiating data processing activity at a node (as opposed to being merely passed on to another node), the message or activity queue entry is placed into a task queue where it is eventually read and acted upon by a compute processor at the node. The compute processor may, as a result of acting on an active protocol message, generate one or more messages for transmittal to another node. It may also determine that additional future processing is required at this node on the active protocol. This might occur, for example, when waiting for a result from another processing node. The compute processor is able to write a protocol entry into the activity queue in such instances to cause the protocol processor to initiate activity on the protocol at a later time.

Also in the preferred embodiment, each protocol engine contains one or more input message buffers and one or more output message buffers. Each input message buffer terminates an incoming message connection from another processing node, and each has an output connected to an input of the message input queue. Each input buffer supplies a signal to a processing node to which it is connected indicating whether it is empty or not. Each output buffer transmits a message to a connected input buffer at another processing node only when the corresponding input buffer at that processing node signals that it is empty. This arrangement in conjunction with the use of independent message input and output protocol processing functions provide the network with automatic message flow regulating and deadlock free operation.

The above summarized parallel processing arrangement allows wide flexibility in the field of parallel processing. The provision for simultaneously handling plural protocols permits the use of a parallel processing network for solving different problems at the same time. The ability of simultaneously handling different types of protocols permits different approaches to be used to solve different parts of a computational task. Protocols of greater complexity than presently available become feasible. For example, the ability to handle distributed sets as one type of protocol opens the door to new techniques of programming parallel processing networks.

These and other advantages of the invention will become apparent after reading the following description.

BRIEF DESCRIPTION OF THE DRAWING

In the Drawing,

FIG. 9 discloses a message passing input function for a tree connect protocol executed at a protocol engine to establish virtual hierarchical trees on the network of FIG. 1 or FIG. 4;

FIG. 19 discloses a protocol algorithm used in the quicksort example for broadcasting a message to all nodes of a virtual tree.

DETAILED DESCRIPTION

Figure 1:
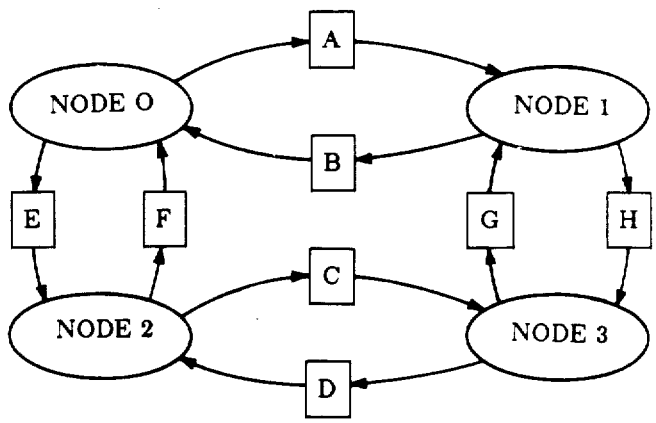
FIG. 1 shows an illustrative two-dimensional hypercube multiprocessor network, which is used to discuss the invention.

A hypercube multiprocessor network is a network of 2 raised to the power n computational nodes numbered 0 through $2n-1$. Each computational node has n bi-directional communication links numbered $0 \ldots n-1$. A two-dimensional hypercube is illustrated in FIG. 1. The hypercube type of network is used to discuss the invention, although it should be realized that the invention is applicable to many kinds of network structures other than hypercubes.

A two-dimensional hypercube network has four computing nodes, one at each corner of a square. These are represented by nodes 0 through 3 in FIG. 1. The lines interconnecting the nodes represent physical links of communication between the nodes in the directions indicated by the arrowheads on the lines. The boxes labeled A through H represent buffers which store data en route to a node from another node. Thus, in FIG. 1, node 0 sends data to node 2 via buffer E and receives data from node 1 via buffer B. A three-dimensional hypercube is formed by connecting corresponding corner nodes of two two-dimensional hypercubes with data communication links such as shown in FIG. 1. Similarly, four-dimensional hypercubes are formed by connecting corresponding nodes of three-dimensional hypercubes, and so on.

Figure 2:
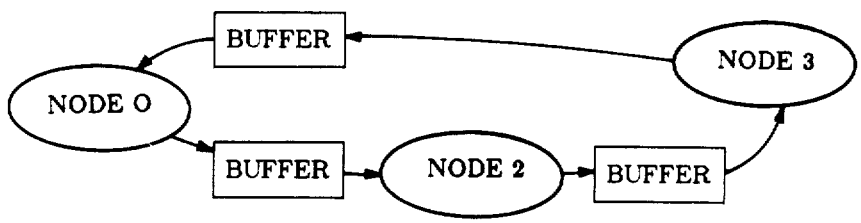
FIG. 2 illustrates a message passing situation, avoided in this system, which leads to network deadlock.

In accordance with an aspect of the invention, data is passed between nodes in discrete sized messages. However, the network is self-regulating in the sense that a message is automatically delayed in its movement to a node when a buffer for receiving the message at the node is not empty. How this is accomplished is described in detail below. In addition, data flow in the network is constrained in a way to avoid deadlock. An example of deadlock is illustrated in FIG. 2. Deadlock would occur, for example, if the network connectivity were such that it were possible for each of three or more nodes to send a message to another one of the nodes in a serial and circular manner (as shown in FIG. 2), but the respective input buffer at each node is full.

Figure 3:
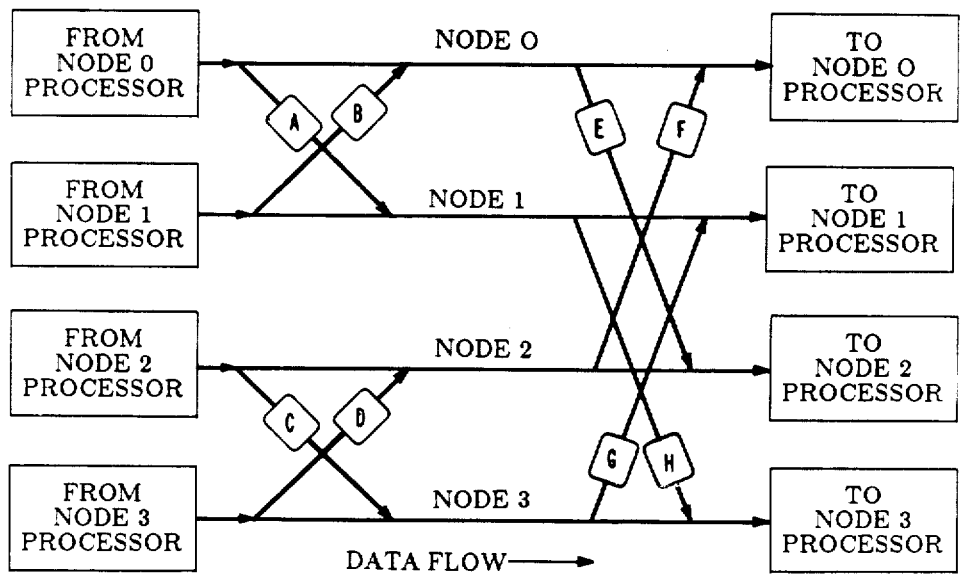
FIG. 3 is a conceptual drawing of FIG. 1 in which the connectivity between the processor nodes of FIG. 1 and the direction of data flow between the nodes prevent deadlock.

Deadlock is avoided by making the network acyclic. When the connectivity of a network is such that data moves in the network only in one direction, say rightward, it is guaranteed to be acyclic and, therefore, deadlock free. This is illustrated in FIG. 3, which is another view of FIG. 1. Each horizontal line of FIG. 3 represents one of the nodes of FIG. 1. The arrowheads on each line on the right side of FIG. 3 represent data flow into the respective node processor. The arrowheads on each line on the left side of the figure represent data flow out of the respective node processor. The buffers A through H of FIG. 1 interconnecting the nodes are also shown. It is seen that data flow is constrained to flow only directly and diagonally to the right. Thus, the hypercube network as used in FIG. 3 is inherently deadlock free. As will be seen, the invention applies equally well to any other network configuration which can be shown to have the acyclic properties of FIG. 3.

Figure 4:
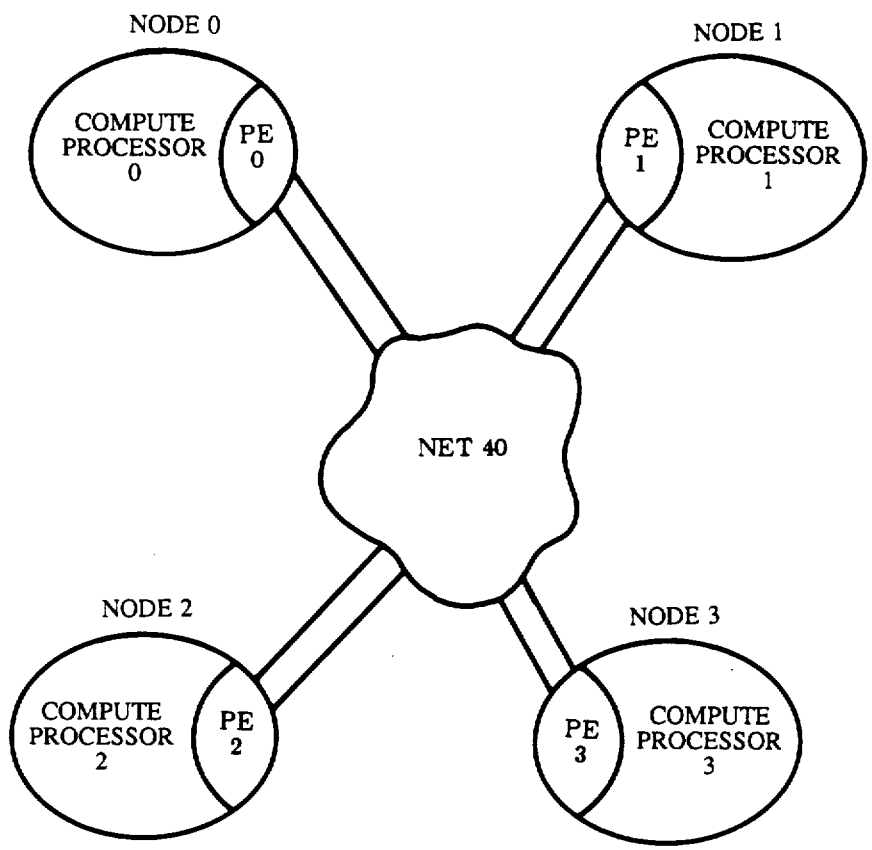
FIG. 4 shows a parallel processing network, such as that in FIG. 1 for example, comprising a plurality of processing nodes, each equipped with a protocol engine (PE) for controlling message passing protocols.

FIG. 4 shows another multiprocessor configuration also illustratively comprising four processing nodes 0 through 3 and being interconnected by a network 40. It is assumed that network 40 is acyclic in nature as above discussed. The network might consist of the buffers A through H connected between nodes as shown in FIG. 1.

Each node of FIG. 4 communicates with network 40 by means of a protocol engine, such as PE 0 in node 0.

The function of the protocol engines is to allow the multiprocessor network to be optimized for the execution of protocols in a message passing architecture. As will be seen, the arrangement allows many sets or subsets of the multiprocessors to simultaneously and independently execute many different protocols. From a programming point of view, this allows a programmer to use standard protocols from a library, for example, to program with a standard set of distributed programming primitives. One or more virtual networks of different apparent node connectivity and associated with the solution of different problems may exist on the physical network at the same time. This allows a programmer to define the communication protocols in such a way that the protocols define a method of solution of an applications program.

Figure 5:
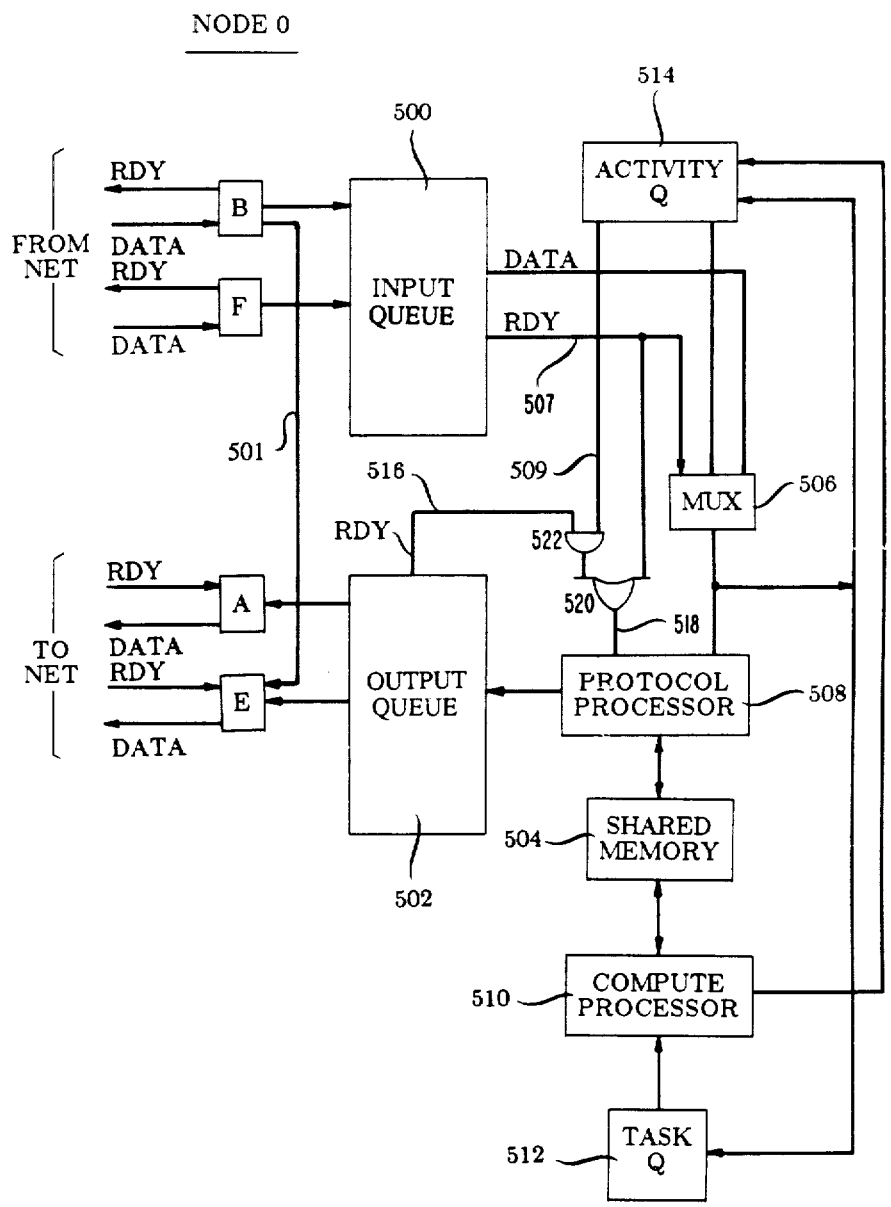
FIG. 5 shows structural details of one node of the illustrative multiprocessor network.

A hardware implementation of PE 0 is shown in FIG. 5. The PE's associated with other nodes are identical to PE 0, with the substitution of appropriate labeling changes in the buffers. By way of example, the physical connectivity shown in FIG. 5 reflects that of the two-dimensional hypercube network of FIG. 1. At the top left of FIG. 5 are shown the buffers B and F which receive data messages from nodes 1 and 2, respectively. At the bottom left is shown the output buffers A and E which output data messages to nodes 1 and 2, respectively.

Each buffer may contain one unit of data of a defined size (a message). Data may not be passed into a buffer that is not empty. For this purpose, each input buffer, such as B and F, returns a signal on an associated lead RDY to its source of messages. Similarly, each output buffer, such as A and E, receives a signal on an associated lead RDY from its destination for passing messages. A message source, such as A, will not pass a message to a buffer unless the associated RDY signal indicates that the buffer is empty.

Messages that are received by PE 0 are passed either into an input queue 500 where they are held until they can be processed by the protocol processor 508 or directly to an output buffer, depending on network connectivity. For node 0 of the network of FIGS. 1 and 3, the message may be routed from input buffer B directly to output buffer E. This corresponds to path 501 in FIG. 5. This communications path is used when node 0 acts as a conduit for a message en route to another node. When protocol processor 508 is ready to process a message from the input queue 500, it is passed to the processor 508 by way of a multiplexer 506. When the RDY lead 507 from input queue 500 to multiplexer 506 indicates that a message is in the input queue, multiplexer 506 gates the message from the input queue into protocol processor 508. Otherwise multiplexer 506 gates an entry in an activity queue to protocol processor 508 if a signal on lead 509 indicates that an activity queue entry is present. The purpose of the activity queue is discussed below.

The protocol processor typically accesses a shared memory 504 during message processing. For example, connect and connect acknowledge messages being passed during the establishment of a virtual tree cause protocol processor 508 to access and update the state vector table shown in FIG. 7. This is described in more detail below. Protocol processor 508 may schedule a task to be executed by a compute processor 510 by placing an entry in a task queue 512. Entries in the task queue are periodically read by the compute processor 510. Protocol processor 508 also places entries in an activity queue 514, as mentioned above. This occurs routinely, as will be more fully described below. For example, when protocol processor 508 performs an input protocol function for a particular protocol, it typically changes a state vector associated with the appropriate instance of the protocol. Protocol processor 508 places a number to identify the modified protocol state vector in the activity queue 514 for subsequent handling by an independent protocol output function.

When protocol processor 508 is ready to transmit a message to another connected network node, it passes the message to the output queue 502 if the RDY lead 516 indicates that the output queue is empty. Otherwise, processor 508 places an entry into the activity queue 514. At some future time when the output queue 502 becomes empty, this entry will be reinputted to protocol processor 508 from the activity queue. The outgoing message is then generated and passed to the output queue.

Figure 6:
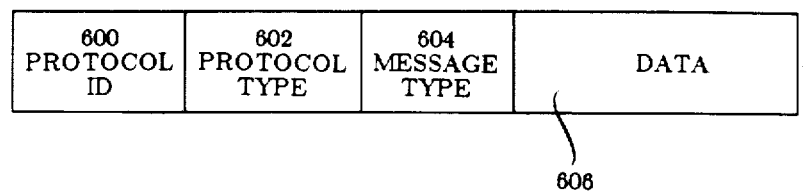
FIG. 6 shows an illustrative format of a data message that is passed among processing nodes of FIG. 1 and FIG. 4.

An illustrative format of data messages that may be passed between processing nodes is illustrated in FIG. 6. Besides the actual data being transferred (field 606), each message contains a field 602 defining a protocol type, such as tree connect, and a message type field 604 defining how the data in 606 is to be interpreted. For example, tree connect and tree connect acknowledge message types are passed in the process of establishing a virtual tree. In addition, a protocol identification field 600 defines the particular protocol instance with which this data is associated. For example, if four virtual trees are established on a network, the protocol identification field identifies with which tree a given message is associated. When an identification of the node from which a message originated is required, it is included in the data field 606.

Figure 7:
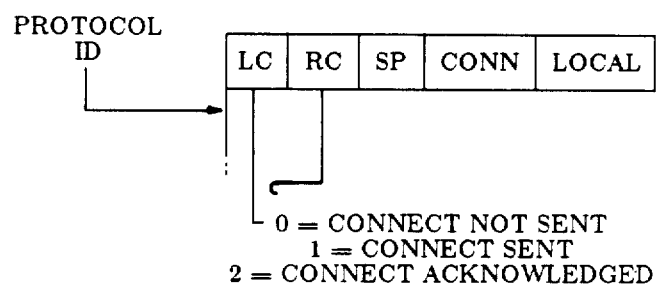
FIG. 7 shows an illustrative format of a state vector table entry maintained at each processing node to be used to establish one or more virtual hierarchical trees of processing nodes of the networks of FIG. 1 or FIG. 4.

The establishment of virtual tree networks on a physical hypercube network of sixteen computing nodes is used to further describe the invention as an illustrative example, it being understood that this is illustrative only. Before proceeding, however, an illustrative format for a tree connect state vector is first described. This format is shown in FIG. 7. An SP (Sent Parent) flag is used to indicate that a C message (tree connect message) has been sent to the parent node of the node in question. When a tree connect acknowledge message is received by a node, the CONN flag is set at that node. When a C message is received at a node from a left child of the node, the LC indicator is set to the value 1. Similarly, RC is set to the value 1 when a C message is received from a right child node. LC and RC are set to the value 2 when a node sends a tree connect acknowledge message to the respective child node. The LOCAL flag is set to indicate that a local task should be scheduled each time a message is received on the protocol instance in question.

Figure 8:
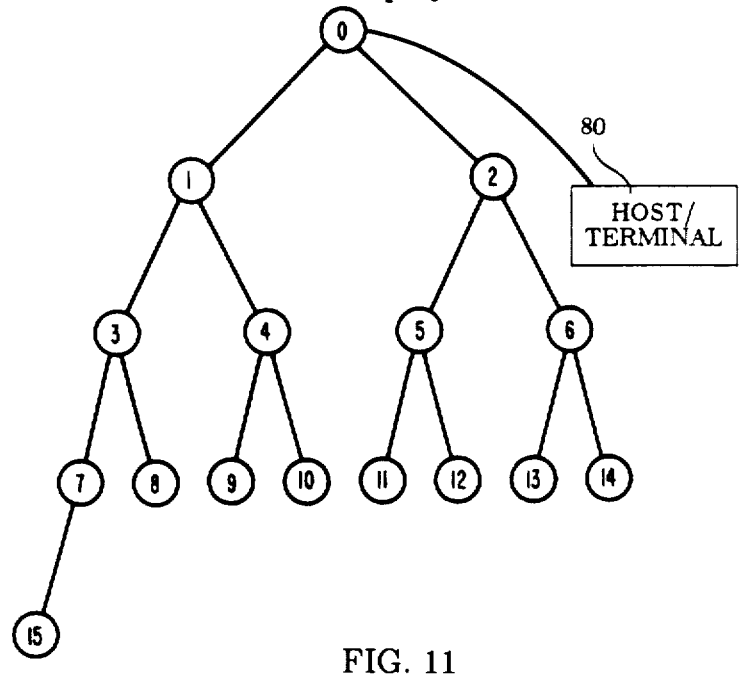
FIG. 8 shows one such virtual hierarchical tree in an illustrative network consisting of sixteen processing nodes.

To simplify the discussion of virtual tree connect, it is assumed that when the illustrative network is first powered up, each node views itself as part of a sixteen node initial tree shown in FIG. 8, where the node numbers 0 to 15 are as shown in the Figure and are assigned to arbitrary ones of the actual processing nodes. It is understood that the actual physical connectivity of the network might be that of a hypercube or other type of network. It is assumed that each node is assigned a position in the initial tree. One way of initially assigning nodes in the initial tree is by including an appropriate firmware program in each node. This firmware in each node might also contain a data map identifying its parent node, if the node is not at the root of the tree, and its left and right child nodes, if the node is not a leaf (terminating node). It is also assumed that the LOCAL flag in each leaf node for the protocol instance (say protocol instance 1) associated with the initial tree is set on power up for reasons described below. Note that virtual tree node 0 (the root node) does not necessarily correspond to physical node 0 in FIG. 1, for example. The node number of a parent node of any other node of this initial virtual tree is defined by the equation parent(x-)=integer[(x−1)/2], where the term "integer" implies truncating any fractional part of the quotient. Thus, the parent node of node 2 (x=2) is "integer [(2−1)/2]", which defines node 0. Similarly, the parent of node 1 (x=1) is node 0, and the parent of node 3 is node 1. A host computer or terminal 80 may be connected to an input buffer of tree node 0 (or any other node of the initial tree) for the further inputting of programs and data once the connections of this initial tree are established. The first problem then is to establish the connectivity of this initial virtual tree.

Figure 10:
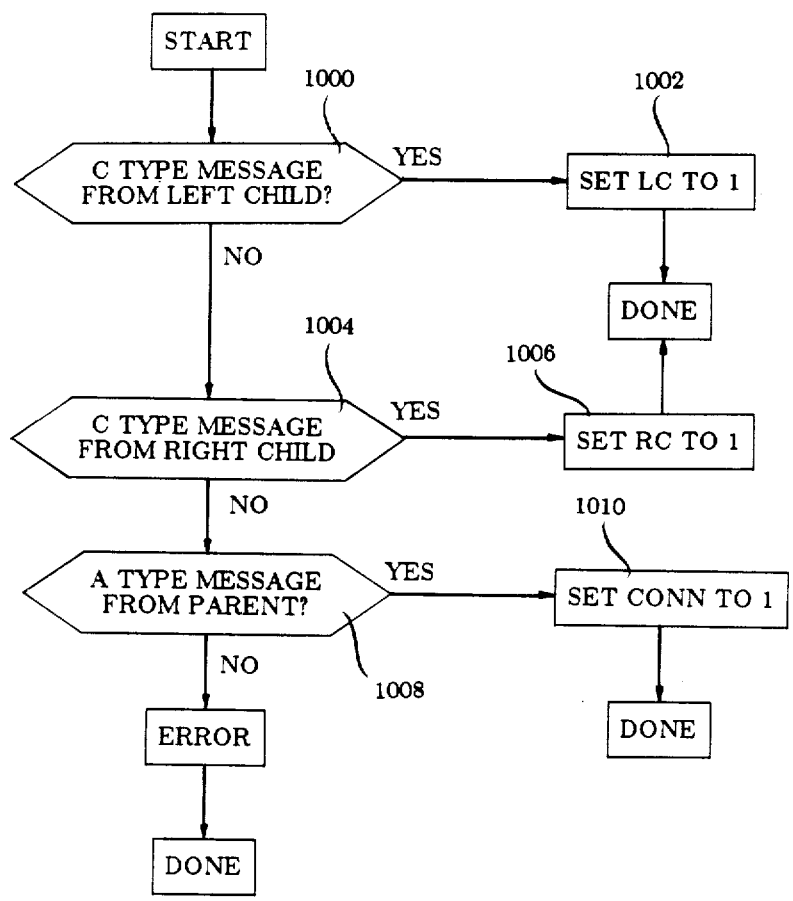
FIG. 10 discloses the complementary tree connect output protocol function executed by each protocol engine.

Each node in the network is equipped with tree connect output and input functions which are used to establish virtual trees. These are asynchronous (independent) functions executed by the protocol processor 508 in the illustrative embodiment. Flowcharts for the tree connect output and input functions are shown in FIGS. 9 and 10, respectively. When power up is performed, these functions are automatically activated so that each is executed periodically. Tree connect protocol 1 for establishing the connectivity of the initial tree is initiated by each of the leaf nodes 15 and 8 through 14 by means of the output function. The process is described from virtual node 15. With reference to FIG. 9, step 900 of the output function at node 15 uses the protocol instance we have assumed to be 1 to interrogate the state vector table in FIG. 7 for this protocol instance. Since the vector is initially reset except for LOCAL, step 900 executes step 902, which transmits a connect (C) type message to its parent, node 7. The protocol ID field 600 of the message contains the value 1, for example, identifying this as tree connect protocol instance 1. The message type field 604 identifies the transmission as a C type message. The message is transmitted from an output buffer at node 15 to an input buffer of its parent node 7. The transmission occurs only when the appropriate RDY signal is present from the intended input buffer. It is primarily this self regulating flow of messages from one node to another only when receiving buffers are empty and the use of the independent input and output functions that process the messages that account for the acyclic nature and the resulting deadlock free operation of the network. Initially, as now, the RDY signal will be present as no other activity is yet occurring in the network. Next, the output function updates the state vector for protocol instance 1 by setting the flag SP (Sent C To Parent) at step 904 in FIG. 9.

The connect message arrives at node 7 via the appropriate input buffer; it is placed in the input queue 500 and steered via multiplexing circuit 506 to protocol processor 508. The protocol type in field 602 of the message identifies a tree connect protocol. Accordingly, the tree connect input function in FIG. 10 is executed; step 1000 of the input function determines from the data field 606 if the message arrived from the left child of this node 7. Since this is the case, step 1002 uses the protocol identifier in field 600 to locate the proper vector in the protocol state vector table and to set the flag LC (Left Child Connect Received) to the value 1.

At a subsequent time, node 7 executes its output function in FIG. 9. Since LC is set to 1 and SP is reset, step 902 results in a C type message being generated and sent to node 3, the parent of node 7. SP of the state vector at node 7 for the protocol instance is set by step 904.

This process continues from each of the nodes receiving a connect (C) message until the root node 0 has received a C type message originating from each of the leaf nodes. With the first C message the root node receives, it then begins a process of acknowledgement to the leaf nodes. The acknowledge propagates through the nodes to the leaf node from which it originated according to the state vectors at each intervening nodes. At node 0, step 900 of the output function determines that LC is set to 1 (representing the C message originated by node 15). SP and CONN are always set to 1 in the root node. Therefore, step 906 is next executed and results in step 908 sending an acknowledge (A) type message to its left child, node 1. Step 910 sets the LC flag to the value 2 to indicate that this node has acknowledged the prior connect message.

At node 1, the acknowledge message from node 0 is detected at step 1008 of the input function. Step 1010 therefore sets CONN to indicate that the node 0 to node 1 connection is established. When the output function is next executed at node 1, steps 906, 908 and 910 result in an acknowledge message being sent to the left child node 3 of node 1. Steps 912, 914 and 916 perform similar operations for the right child at the appropriate time.

Subsequent C messages from other leaf nodes are propagated upward until a node is reached which has already received a C message from some other node in the tree. Acknowledgement messages are then propagated downward in the tree along the paths from which the C message arrives, all according to the states of the state vectors. For example, the root node sends an acknowledge (A) message to its right child node 2 when it receives the first C message from one of the leaf nodes 11 through 14. In response to this C message, node 0 executes step 912 which results in an A type message being sent to the appropriate child node 2 at step 914 and the RC (right child) flag set to the value 2 at step 916 to indicate that an acknowledge message has been sent.

Actions similar to those described above occur at all the network nodes as C and A messages are received and sent. An examination of the input and output functions that are executed at each node of the initial tree reveals that eventually every node of the tree receives an acknowledge message and updates its state vector accordingly. At this time, the initial tree is completely established (connected). Each node of the tree as it receives an acknowledgement may start to perform some task associated with the initial tree before other nodes of the tree are established. Any results to be transmitted to other nodes of the tree that are not yet established will be held up according to the protocol rules of the task until the receiving node is, in fact, established in the tree.

Figure 11:
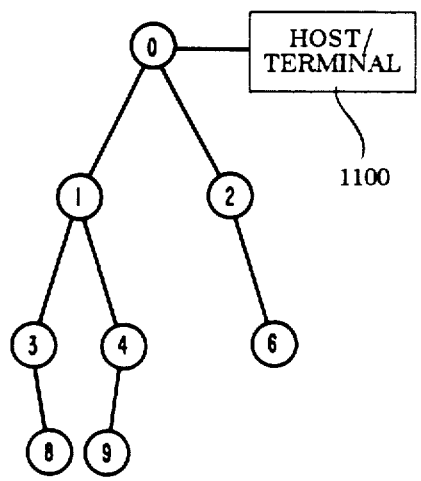
FIG. 11 shows a second virtual hierarchical tree of processing nodes established on the network of FIG. 8.

When the tree is completely established, the established virtual initial tree may be used to establish other full or partial virtual trees representing different protocol instances for the solution of different problems. FIG. 11 illustrates an instance of this. A host computer or programmer at a terminal 1100 might initiate an operation to establish a virtual tree consisting of leaf nodes 8, 9 and 6. This virtual tree might have the protocol identifier value 2, for example, to distinguish it from protocol 1 used to establish the initial virtual tree. Thus, host or terminal 1100 causes virtual node 0 of the initial tree to broadcast messages to each of the prospective leaf nodes 8, 9 and 6. These messages request the leaf nodes to begin the establishment of the new virtual tree as protocol number 2. From this point on, the leaf nodes transmit C type messages to their parents in the new tree and receive A type messages in response until the new tree is established. At this point, the host may proceed to program the individual nodes of tree 2 in some desired way.

Figure 12:
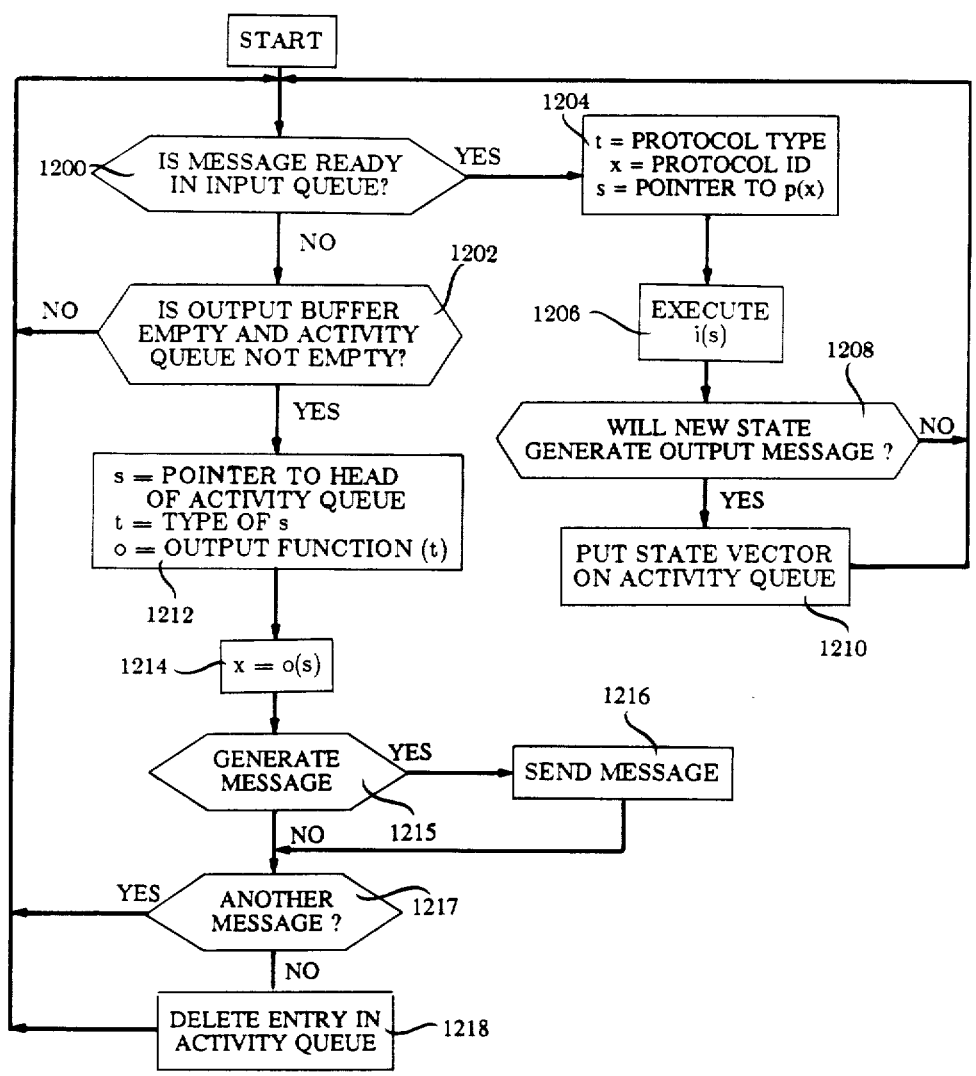
FIG. 12 discloses operations of a protocol engine in administering one or more message passing protocols.

The flowchart of FIG. 12 illustrates the operations a protocol engine at a processing node performs to administer plural types of protocols and plural instances of each type of protocol simultaneously. Steps 1200 and 1202 correspond to functions performed by multiplexer 506. Step 1200 determines if there is any message in the input queue 500. If so, steps 1204, 1206, 1208 and 1210 perform the input function for the message. These steps correspond roughly to functions that may illustratively be performed by protocol processor 508. Specifically, step 1204 extracts the protocol type t from field 602 of the data message. It should be remembered that the protocol type identifies differing protocols, such as the tree connect protocol discussed above, or perhaps distributed sets or shared memory protocols as other illustrative examples. The protocol type is used to identify an input function i and a state vector array p associated with this protocol type. For example, for the tree connect protocol, the type identifies the input function shown in FIG. 10. Array p contains the individual state vectors for different instances of this protocol type. Recall that the protocol ID identifies an instance of a protocol type. Step 1206 uses the protocol ID x from field 600 of the message to generate an identifier s of the state vector p[x] for this instance of this protocol type. Step 1206 executes the input function for this protocol. In general, this results in a change to the state vector. If the state vector change will cause the output function to generate an outgoing message, as determined at step 1208, the new state vector, or perhaps a pointer to the new state vector, is placed on the activity queue 514 by step 1210. The algorithm of the protocol engine then begins again at START. Eventually, there will be no message in the input queue. At this time, if the output buffer 502 is empty, the state vector identifier just placed on the activity queue (or some other identifier) is unloaded by step 1202.

Steps 1212 and 1214 perform functions similar to those of steps 1204 through 1208 to identify an output function for this protocol type and execute it. The result of execution at step 1214 also changes the state vector for this protocol instance, in general, and the state vector array is updated accordingly. If a message has been generated by the output function, it is transmitted by steps 1215 and 1216. The output function may, in fact, result in the generation of several messages. These must be sent one at a time as an output buffer becomes empty. In this case (step 1217), the entry on the activity queue that initiated the present activity is left on the activity queue to initiate sending of the next message. Otherwise, the activity queue entry is deleted at step 1218.

Figure 13:
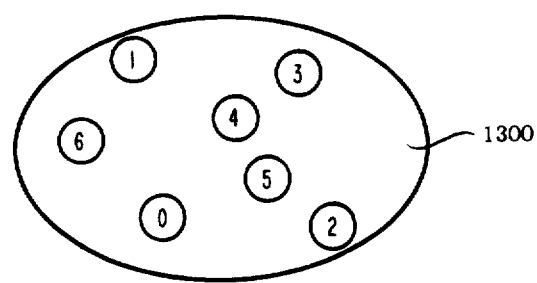
FIGS. 13 through 15 are conceptual drawings of a quicksort algorithm that is used to illustrate programming a virtual tree network using distributed set protocols.
Figure 14:
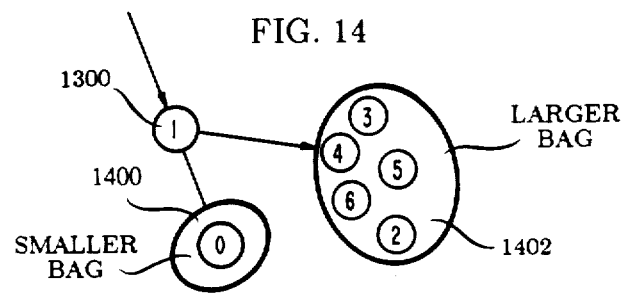

FIG. 13 demonstrates the power and flexibility of the principles discussed thus far. The example is an implementation of the quicksort algorithm using set primitives distributed across multiprocessor nodes configured as a virtual tree as discussed above. Before proceeding with details of the algorithm, it is discussed in conceptual terms. The algorithm sorts an unordered set of data, presuming the data is initially in memory, and leaves the sorted information in memory existing as a set of instances of tree protocols. At the start of the algorithm there is a bag 1300 of elements (numbers 0 through 6 in this example). The first phase of the algorithm is to arbitrarily select one element (say 1) and designate it as the decision element. The second phase partitions the remaining elements into two new bags with the property that all elements smaller than the decision element go into one bag, those larger in the other. The result at this stage is three bags of elements as shown in FIG. 14, the original bag, with only the decision element 1, the smaller bag 1400, with elements smaller (or equal to) the decision element, and the larger bag 1402 containing the rest of the elements. The algorithm is then applied recursively to the smaller and larger bags until all elements are sorted.

Figure 15:
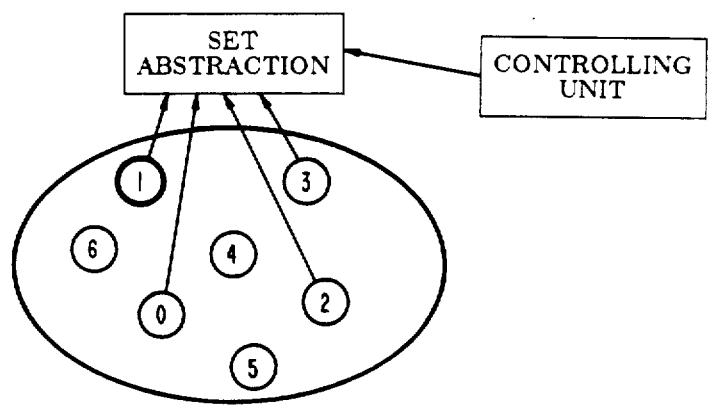

The elements to be sorted may be viewed as processes in the various nodes of a tree and the original bag may be viewed as a set primitive. The elements manifest their presence in the bag by trying to read from the set primitive representing the bag. The first phase, decision element selection, is illustrated in FIG. 15. Initially, decision element selection starts with a controlling unit (a user terminal or a host computer connected to the root node of the tree), located outside the bag. The controlling unit does a "write to one" set protocol operation of a dummy value into the set representing the bag. The decision element selection phase ends with one element knowing that it is the decision element (illustrated by the bold circle on element 1 in FIG. 15). To begin the bag partitioning, the decision element 1 creates the two new bags 1400 and 1402 by creating two initially empty set primitives. The decision element then formats a message consisting of its key value and the identities of the two new bags and does a "write to set" primitive representing the original bag. All the elements see this message. They then compare the key in the message with their value and change their membership to one of the two new bags. The process is then repeated by selecting decision elements in each of two new bags and partitioning these bags. The algorithm ends when all elements have been made decision elements.

Figure 16:
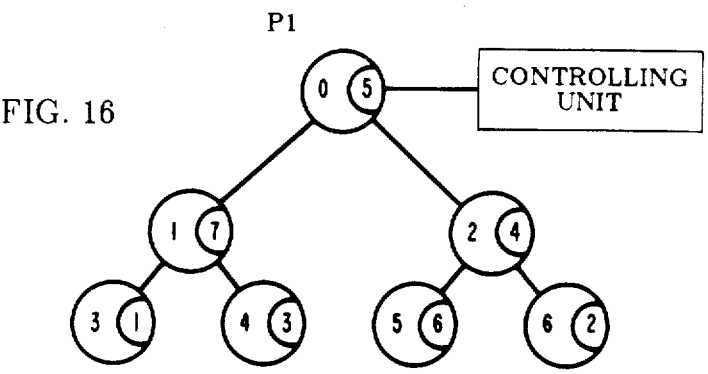
FIGS. 16, 18 and 19 show virtual trees created by the quicksort algorithm in performing a sort.
Figure 17:
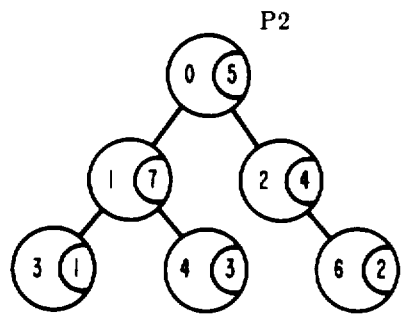
FIG. 17 shows a message broadcast protocol algorithm used in establishing the virtual trees of FIGS. 16, 18 and 19.
Figure 18:
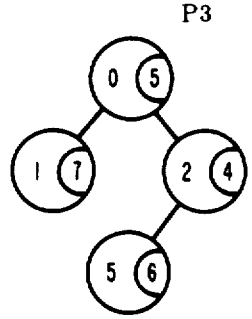
Figure 19:
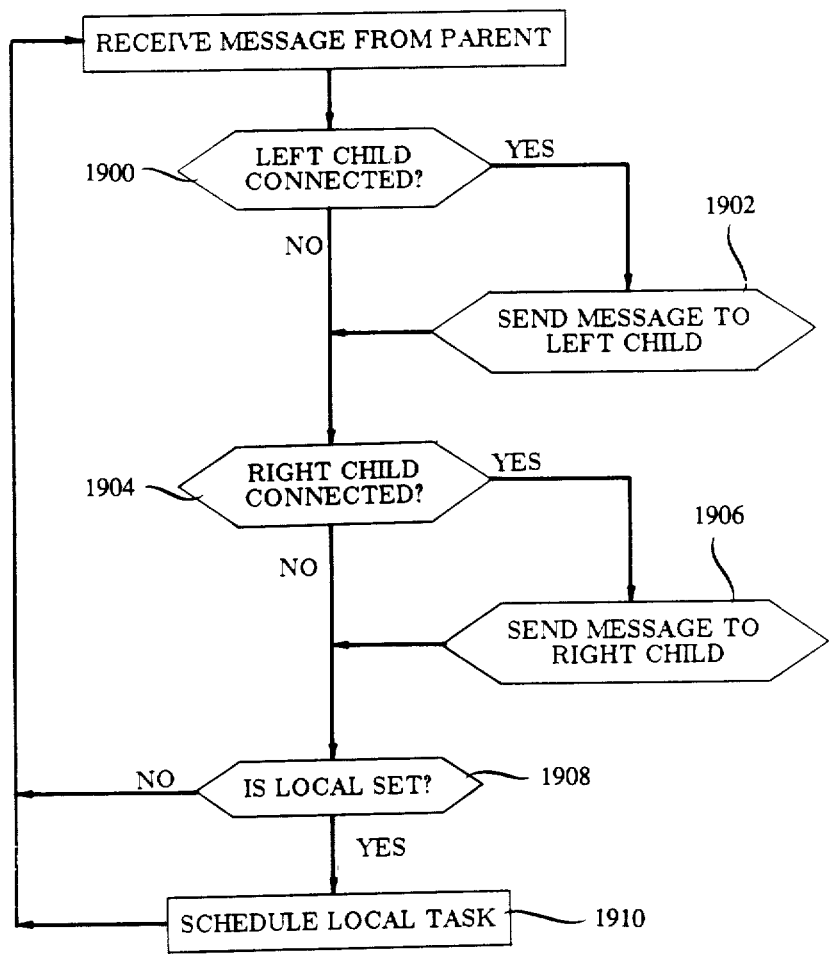

A realization of the quicksort algorithm is discussed with respect to FIGS. 16 through 18. FIG. 16 shows a tree of process nodes 0 through 6, which may have been established according to a tree connect protocol discussed earlier. Messages are passed between the nodes of this tree by means of one instance of the tree protocol whose input and output functions are shown in FIGS. 9 and 10. Let's call this protocol identifier for this instance P1. It is assumed that each node already has an element (number) to be sorted stored in its memory and that each node is programmed to perform the appropriate steps of the quicksort algorithm. These numbers are selected to also be 1 through 7 for this example and are shown in a semicircle within each of the processing nodes. The numbers may have been computed by the processing nodes as part of some distributed program already partially completed, for example, or the numbers may have been written to the nodes by a controlling unit. Let's assume that node 2 is selected by the controlling unit to be the initial decision element. Node 2 is informed of this by a message from the controlling unit via tree protocol instance P1. In response, node 2 allocates two new protocol instances identified by, say, P2 and P3 and formulates a broadcast type of message containing its sort number 4 and the new protocol identifiers. This message is sent to the root node 0 from whence it is broadcast to all nodes of the tree. The broadcast protocol performed at a node in response to reception of a broadcast message is shown in FIG. 17. Step 1700 examines the LC (left child) indicator of the P1 state vector table (FIG. 7) for the value 2 to determine if a left child is connected. If so, at step 1702, the node readdresses the message for this left child and places it in the output queue 502 when the queue becomes empty. Similarly, steps 1704 and 1706 perform the same function for a right child node, if present. Step 1708 determines from the LOCAL flag of the appropriate state vector whether or not the node is a member of the tree with which the received message is associated. If so, step 1710 schedules a local task by putting the received message into the task queue 512. The message is eventually read and acted upon by the compute processor 510. Thus, the broadcast message originated by node 2 in FIG. 16 is passed to and acted upon by every other computing node which is a member of the protocol instance P1. The result is that two new trees are formed for protocols P2 and P3, and each processing node becomes a member of one of the new trees depending on whether or not its sort number is larger or smaller than the decision number from node 2. The new trees are formed as follows. Children having smaller sort numbers than the decision number send connect (C) messages to their parent nodes with a protocol ID equal to P2. Thus, nodes 3 and 4 send C messages to node 1, node 1 sends to node 0, and node 6 sends a C message to node 2, which in turn sends it on to node 0. Acknowledgement (A) messages are returned in response to each of the C messages as described with respect to FIGS. 9 and 10. The result is the formation of the P2 tree shown in FIG. 18. In addition, node 7 sends a C message to node 0, node 5 sends to node 2 and node 2 sends to node 0. Acknowledgements are returned and the P3 tree shown in FIG. 19 is established. When the leaf nodes of the P2 and P3 trees receive the acknowledgements from their parents, they return collective acknowledgement messages to the original decision element node to inform it that they are ready for the next partitioning process. Thus, in the P3 tree, a collective acknowledgement is sent from node 1 to node 0 and hence to node 2, and a collective acknowledgement is also sent from node 5 to node 2. These messages are sent via the P1 tree.

Figure 20:
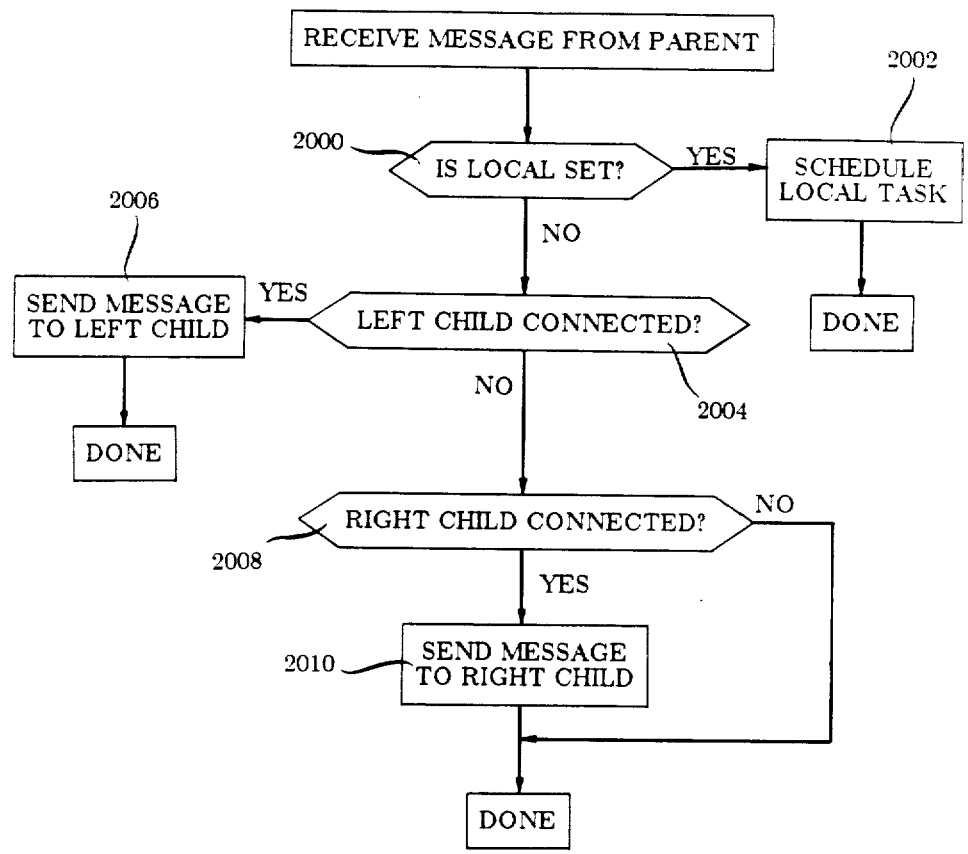
FIG. 20 discloses a "write to one" protocol algorithm used in the quicksort example for transmitting a message to a single node of a virtual tree.

Likewise, in the P2 tree, collective acknowledgements are sent from nodes 3 to 1, hence 1 to 0, hence 0 to 2, and from nodes 4 to 1, hence 1 to 0, hence 0 to 2, and from node 6 to 2. All these collective acknowledgements are transmitted via the P1 tree. At this time, the two new trees P2 and P3 are completely set up. Decision element selection now occurs in each of the new trees P2 and P3. This is accomplished by the original decision element node 2 performing a "write to one" node protocol on each of the new trees P2 and P3. One implementation of a "write to one" protocol is shown in FIG. 20. If LOCAL is set in a state vector when a message is received from a parent (step 2000), meaning that this receiving node is a member of this protocol tree, a local task is scheduled at step 2002, and the message is not passed to any further nodes. If LOCAL is not set, then the message is passed either to the left child (if connected) (step 2006) or to the right child (step 2010), but not to both children. Thus, in the example at hand, node 2 writes on P2 to node 0. According to the rules of this "write to one", the first node which is part of P2 to receive the message retains the message and becomes the decision element node for the next recursion of the algorithm. Node 0 is not part of P2, but only acts as a message-passing conduit for this tree. Therefore, node 0 eventually passes the message to its child, node 1. Node 1 also is not a member of P2. Node 1 therefore passes the message to its left child node 3, which then becomes the decision element for P2.

Similarly, node 2 does a "write to one" on P3 toward node 0. Since node 0 is a member of the P3 tree, node 0 retains the message and designates itself as the P3 decision element. The partitioning process now recursively continues with the P2 and P3 trees being used to form new P4, P5 and P6, P7 trees, and so on. The process stops when all nodes involved in the algorithm have been designated as decision elements. The sorted state of the original sort numbers is manifested in the protocol IDs P3, P4, etc. At this point, another phase of an overall problem, i.e., a phase based on using the sorted numbers, might begin.

It is understood that the above-described arrangements are illustrative of the application of the principles of the invention, and that other arrangements may be devised by those skilled in the art without departing from the spirit and scope of the invention.

I claim:

1. A parallel processing system including a plurality of processing nodes interconnected in a prescribed manner for passing messages directly between the processing nodes and message passing protocol apparatus at each node for sending and receiving said messages, said messages containing information identifying a protocol type to which a message belongs, said protocol type identifying rules for processing the message, an identification of a task being processed using the protocol type and data, said protocol apparatus comprising:

input means for receiving a message from a first node connected to the input means and including means for signaling to the first node that the input means is empty, output means for sending a message to the input means of a second connected node only when the input means at the second node signals that it is empty, a protocol processor for independently performing protocol input functions and output functions on messages received and to be transmitted, respectively, according to the protocol type identified in the message; and a memory accessible by the protocol processor for storing state information individually pertaining to each task being processed and containing protocol status information for controlling the operations of the input and output functions pertaining to each task, said input and output functions operating to change the state information.

2. The system of claim 1 wherein a processing node further comprises:

a compute processor having access to the memory and being responsive to the data in a received message and to the state information pertaining to the task with which the data is associated for performing a data processing operation and storing results of the operation in the memory for access by the protocol processor.

3. The system of claim 2 wherein the protocol apparatus further comprises:
an input queue for storing messages incoming from other ones of the processing nodes and being accessible by the protocol processor.

4. The system of claim 3 wherein the protocol apparatus is further characterized by
an activity queue accessible by the protocol processor for storing identifications of incoming messages received by the protocol processor from the input queue and requiring subsequent processing by the protocol processor;
multiplexer means interconnecting an output of the message input queue and an output of the activity queue to the protocol processor, and
control means for selecting input data to the protocol processor either from the input queue or from the activity queue.

5. The system of claim 4 wherein the protocol apparatus further comprises:
a task queue accessible by the protocol processor for storing data from a received message for a local processing operation to be performed by the compute processor in response to the message.

6. The system of claim 3 wherein the input means further comprises:
a plurality of input message buffers each terminating an incoming message connection from another processing node and each having an output connected as an input to the message input queue; and
wherein the output means further comprises a plurality of output buffers each connected to a different one of other processing nodes for transmitting messages thereto;
each input buffer having means for supplying a signal to a processing node to which it is connected indicating whether it is empty or not; and
each output buffer having means for transmitting a message to the connected processing node only when the input buffer at that processing node signals that it is empty.

7. A parallel processing system including a plurality of processing nodes interconnected in a prescribed manner for passing messages between ones of the nodes and message passing protocol apparatus at each node for sending and receiving said messages, said messages containing a protocol type field, a message type field and a protocol identifier field, the protocol type field identifying the particular protocol to which the message pertains, the protocol identifier field identifying a particular task using the protocol type and the message type field identifying the operations to be performed at a node receiving a message,
each protocol apparatus comprising:
an input message buffer for each incoming connection at the associated node to another one of the nodes;
an output message buffer for each outgoing connection of the associated node to another one of the nodes;
means for notifying a node connected to one of the input buffers whether or not that input buffer is empty;
means for inhibiting message transmission from an output buffer to another node when the connected input buffer at that node is not empty;
a memory for storing state information describing the state of each task in progess;
means for identifying and executing an input protocol function pertaining to the protocol type of a received message;
means for identifying and executing an output function pertaining to the protocol type of a message to be transmitted to another processor;
said input and output functions independently operating to update the state information for the associated task according to the rules of the associated protocol types.

8. A parallel processing system comprising:
a plurality of processors;
bus means interconnecting designated ones of said processors to form a parallel processing network;
protocol apparatus at each processor for transferring messages among said processors, each message including a signal identifying the message protocol type, a signal identifying a task using the protocol type, and data signals;
said protocol apparatus comprising;
a protocol processor for performing independently input operations and output operations on messages received from said bus means and messages to be transferred to said bus means, respectively; and
a memory for storing state vector signals corresponding to each task being processed by the system, said memory being connected to said protocol processor and including protocol status signals for controlling said input and output operations for each task;
said protocol processor being responsive to said input and output operations to modify said state vector signals.

* * * * *